(12) United States Patent
Askew et al.

(10) Patent No.: US 12,373,899 B2
(45) Date of Patent: Jul. 29, 2025

(54) TRANSPARENCY SYSTEM AND METHOD OF USE

(71) Applicant: ADP, Inc.

(72) Inventors: Floyd Askew, Morrow, GA (US); Bhaskar Bhide, Alpharetta, GA (US); Thiago Correia De Brum, Braselton, GA (US); Acey Bunch, Sugar Hill, GA (US); Chris J. Davis, Alpharetta, GA (US); Jingyuan Hu, Cumming, GA (US); Kamilah Kiser, Lawrenceville, GA (US); Cheryl Lewis, New York, NY (US); Juliano Sanches Maia, Atlanta, GA (US); Diego Nobre, Alpharetta, GA (US); Yuhong Zha, Suwanee, GA (US)

(73) Assignee: ADP, Inc., Roseland, NJ (US)

( * ) Notice: Subject to any disclaimer, the term of this patent is extended or adjusted under 35 U.S.C. 154(b) by 391 days.

(21) Appl. No.: 17/355,854

(22) Filed: Jun. 23, 2021

(65) Prior Publication Data

US 2022/0414791 A1    Dec. 29, 2022

(51) Int. Cl.
*G06Q 40/12* (2023.01)
(52) U.S. Cl.
CPC .................................. *G06Q 40/125* (2013.12)
(58) Field of Classification Search
CPC ...... G06Q 40/00; G06Q 40/04; G06Q 40/125; G06Q 30/00
See application file for complete search history.

(56) References Cited

U.S. PATENT DOCUMENTS

| D824,405 S | 7/2018 | Narinedhat et al. |
| D840,428 S | 2/2019 | Narinedhat et al. |
| 11,861,335 B1 * | 1/2024 | Margolin ................. G06N 5/01 |
| 2010/0325588 A1 * | 12/2010 | Reddy ................. H04L 63/0263 |
| | | 706/12 |

(Continued)

FOREIGN PATENT DOCUMENTS

EP    2211277 A1 *    7/2010    ......... G06F 17/2247

OTHER PUBLICATIONS

Best Payroll Software for 2022, CIO Insight (Year: 2022).*

(Continued)

*Primary Examiner* — Richard C Weisberger
(74) *Attorney, Agent, or Firm* — Foley & Lardner LLP

(57) ABSTRACT

The present disclosure relates generally to a tool for developing insights relevant to database changes and, more particularly, to a payroll transparency system and method of use. The method includes: comparing, by a computer system, a field of a first paycheck to a corresponding field of a second paycheck; determining, by the computer system, that a value of the field of the first paycheck and a value of the corresponding field of the second paycheck are different; determining, by the computer system, a reason for the value of the field on the first paycheck being different than the value of the corresponding field on the second paycheck; and generating, by the computer system, a notification on a graphical user interface explaining the reason for the value of the field on the first paycheck being different than the value of the corresponding field on the second paycheck.

8 Claims, 10 Drawing Sheets

(56) References Cited

U.S. PATENT DOCUMENTS

2015/0193489 A1* 7/2015 Bachar ................ G06F 16/2282
 707/756
2023/0094284 A1* 3/2023 King .................... G06Q 40/125
 705/32

OTHER PUBLICATIONS

Clarke, Best Payroll Software for 2022, Compare Vendors, CIO Insight (Year: 2022).*
Tim Fisher, "What Is a Node in a Computer Network?", Lifewire, Dotdash Meredith, Sep. 27, 2021, https://www.lifewire.com/what-is-a-node-4155598, 5 pages.

* cited by examiner

FIG. 10

TRANSPARENCY SYSTEM AND METHOD OF USE

TECHNICAL FIELD

The present disclosure relates generally to a tool for developing insights relevant to database changes and, more particularly, to a payroll transparency system and method of use.

BACKGROUND

Common elements of a paycheck include earnings (i.e., the amount of money earned by the worker during the pay period), deductions (i.e., amounts of statutory, voluntary, and benefits deductions subtracted from the earnings), and a net pay amount (earnings less deductions). Occasionally an event impacts an employee's net pay amount, which may be of concern to the employee.

For example, often when such an event occurs, the employee reaches out to their manager or Human Resources (HR) department or Payroll department for assistance in understanding the reason for the difference in their paycheck. Such requests for assistance often consume resources (manager/HR/Payroll) that reduce the availability of those resources for other uses.

SUMMARY

In a first aspect of the present disclosure, a method of providing insights for a paycheck change comprises: comparing, by a computer system, a field of a first paycheck to a corresponding field of a second paycheck; determining, by the computer system, that a value of the field of the first paycheck and a value of the corresponding field of the second paycheck are different; determining, by the computer system, a reason for the value of the field on the first paycheck being different than the value of the corresponding field on the second paycheck; and generating, by the computer system, a notification on a graphical user interface explaining the reason for the value of the field on the first paycheck being different than the value of the corresponding field on the second paycheck.

In another aspect of the present disclosure, a computer program product comprises one or more computer readable storage media having program instructions collectively stored on the one or more computer readable storage media. The program instructions are executable to: analyze a first paycheck and a second paycheck; determine if there is a difference between the first paycheck and the second paycheck; scan all nodes of the first paycheck and the second paycheck to determine a difference in the nodes; send any node differences to a library; analyze the library to determine that the library includes a reason of the node differences; generate, based on the reason found in the library, a message containing the reason; and transmit the message to an electronic display accessible by the user.

In another aspect of the present disclosure, a system comprises: a processor, a computer readable memory, one or more computer readable storage media, and program instructions collectively stored on the one or more computer readable storage media. The program instructions executable to: build a tree representation of fields of a first paycheck, the fields being represented as nodes in the tree representation; build a tree representation of fields of a second paycheck, the fields being represented as nodes in the tree representation; compare the nodes of the first paycheck to corresponding nodes of the second paycheck to find differences; generate a payment calculation graph by applying rules to the nodes and the corresponding nodes that are different; determine an insight from the payment calculation graph, the insight being an explanation as to why the nodes and the corresponding nodes are different; and provide the insight in a graphical interface format with wage information associated with the second paycheck.

BRIEF DESCRIPTION OF THE DRAWINGS

The present disclosure is described in the detailed description which follows, in reference to the noted plurality of drawings by way of non-limiting examples of exemplary embodiments of the present disclosure.

FIG. 10 depicts an exemplary display in accordance with aspects of the present disclosure.

DETAILED DESCRIPTION OF ASPECTS OF THE PRESENT DISCLOSURE

The present disclosure relates generally to a tool for developing insights relevant to database changes and, more particularly, to a payroll transparency system and method of use. More specifically, the payroll transparency system provides insights to payroll statements, e.g., deductions, withdrawals, etc., which originate within a payroll database. In accordance with aspects of the disclosure, the payroll transparency system provides insight to the recipient of a paycheck, such as, for example, an employee, regarding any changes to the paycheck as compared to previous paychecks. For example, the payroll transparency system compares one paycheck to another paycheck to discover one or more changes between the paychecks, determines a reason for each of the changes, and provides the reason to the recipient of the paycheck to anticipate and answer questions the recipient might have regarding the changes. Advantageously, by implementing the payroll transparency system it is now possible to reduce or even eliminate the need for assistance by third parties in interpreting changes to a payroll event.

In embodiments, the payroll transparency system can be implemented in a computer program product or computing system as described in more detail herein. The payroll transparency system can effectively reduce or prevent questions being addressed to a payroll or human resources department. In more specific embodiments, the payroll transparency system can provide a reason to the recipient of the paycheck in anticipation of an issue, thereby providing answers to questions the recipient might have regarding any changes to their paycheck. These changes may include deductions or other changes to a payroll statement, which are not recognizable to the employee, as an example. This can be accomplished by performing, for example, pattern analysis when comparing pay details of two or more pay periods, thereby allow the system to generate/determine insight messages explaining to the user the reason for a change to net pay or an entire payroll run.

Figure 1:
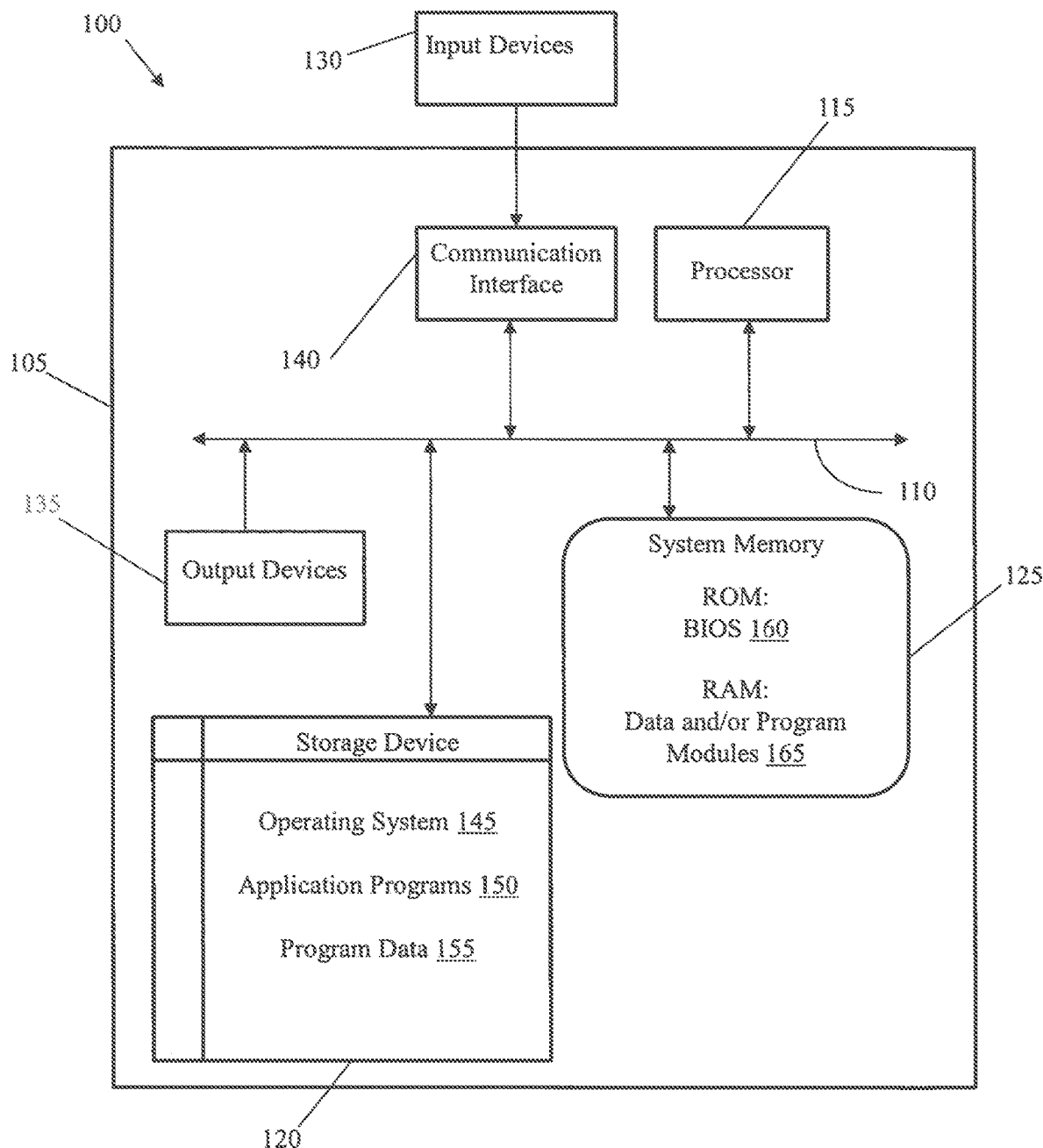
FIG. 1 is an illustrative architecture of a computing system implemented as embodiments of the present disclosure.

FIG. 1 is an illustrative architecture of a computing system 100 implemented as embodiments of the present disclosure. The computing system 100 is only one example of a suitable computing system and is not intended to suggest any limitation as to the scope of use or functionality of the present disclosure. As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 105 can gather (e.g., pull) data across a variety of sources (multiple feeds) such as, e.g., aggregated employment and income data in granular geographic locations, as well as payroll deduction data, tax law and regulation data, payroll related legal data, healthcare insurance and other payroll related healthcare data, payroll related retirement plan data, etc. The processer 105 can collate such data and use it to determine one or more reasons for a change in net pay reflected on a paycheck, e.g., why a 401(k) deduction changed relative to a previous paycheck, why gross pay increased relative to a previous paycheck, etc.

In embodiments, processor 115 may receive input signals from one or more input devices 130 and/or drive output signals through one or more output devices 135. The received input signals may be the data (received information) used by processor 115 to provide the functionality of the systems and methods described herein. In embodiments, input devices 130 may be any system (e.g., feed) which can collect and provide information to the system 100, in order to determine reasons for changes between two paychecks. For example, the input devices 130 can include payroll information obtained from third party suppliers, e.g., ADP. This information can be used to determine a reason for a change in a paycheck relative to a previous paycheck or a standard (or "normal") paycheck. The output devices 135 can be, for example, any display device, printer, audio speakers, etc.

The storage device 120 may include removable/non-removable, volatile/non-volatile computer readable media, such as, but not limited to, non-transitory media such as magnetic and/or optical recording media and their corresponding drives. In embodiments, the storage device 120 can be configured to store payroll data and reasons for changes to payroll events as described herein. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as input devices 130, mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to perform the tasks as described herein (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

Figure 2:
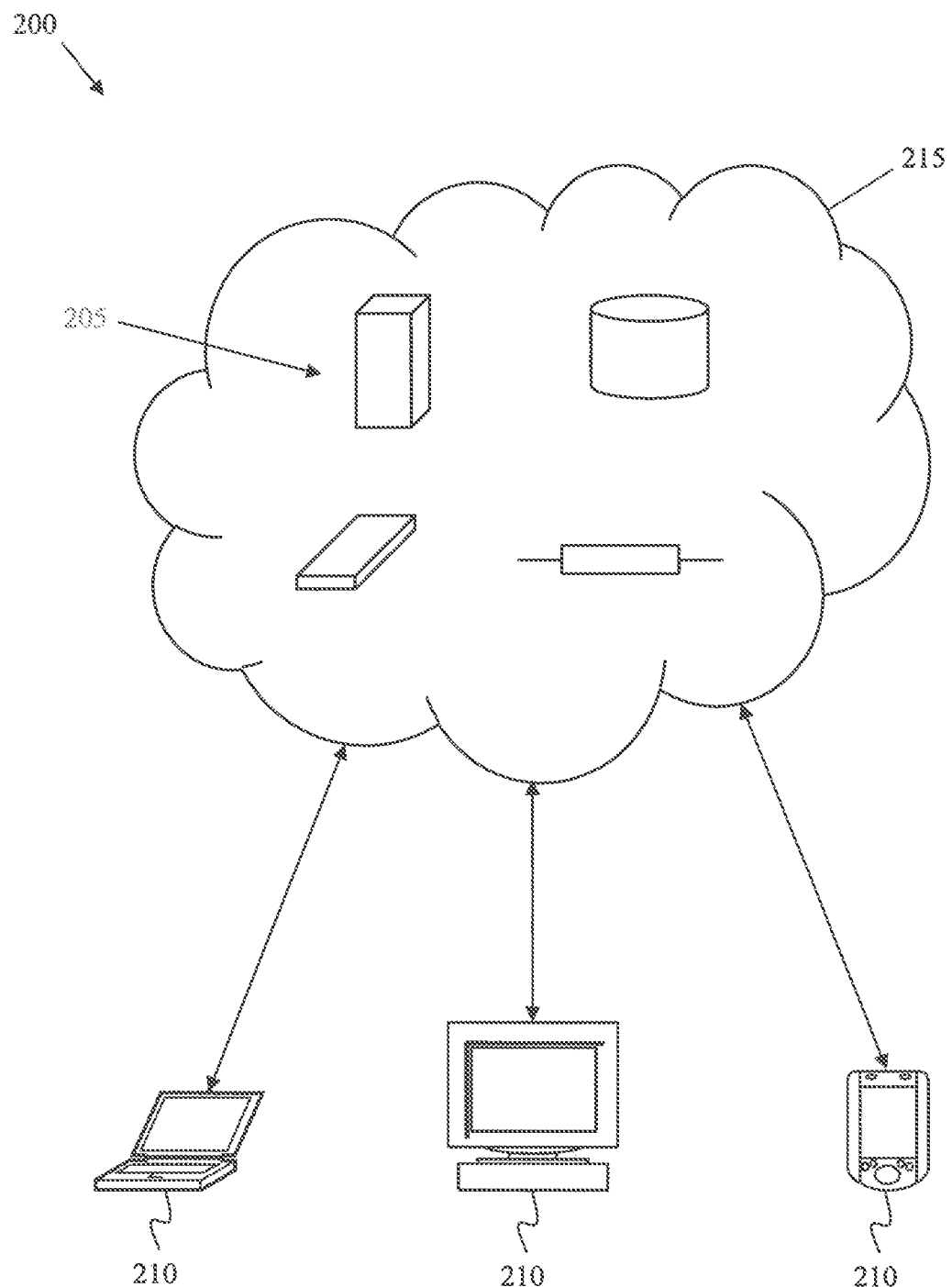
FIG. 2 shows an exemplary cloud computing environment in accordance with aspects of the present disclosure.

FIG. 2 shows an exemplary cloud computing environment 200. Cloud computing enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers, cellular telephones), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

More detail will now be provided regarding the systems, processes, computer program products, and methods in accordance with the present disclosure. More specifically, in accordance with aspects of the present disclosure, the system described herein performs pattern analysis by comparing pay details of two or more pay periods, and then provides insight messages explaining to the user (such as, for example, the recipient of the paycheck) reasons for any changes between the two or more pay periods. These insights are termed reactive insights which manifest themselves once a current pay is compared with the previous pay. Situations in which reactive insights may be generated include as illustrative, non-limiting examples: (1) for employees, when the most current paycheck is compared with the preceding paycheck; and (2) for payroll practitioners, when a payroll is about to be approved or has been approved, and there are facts that deviate from previous payroll runs.

In embodiments, the process of analyzing two payroll events and comparing the information between them includes identifying a difference (or delta) in paycheck nodes (i.e., earnings or deductions) of one single paycheck or a batch of paychecks. For this, the system scans all nodes looking for relevant information such as policy type, result type, etc., and sends this information to a pattern library (i.e., a repository of payroll facts) that analyzes the information to assess whether or not there is a payroll fact that matches with the paycheck analysis. In the event paychecks with deltas are analyzed by the pattern library and it is determined that a relevant payroll fact exists, one or more insight messages are generated to a user device for display to the user. The insight messages will provide reasons for the change in the payroll event.

In embodiments, a payroll fact is a situation that is accounted for in the system as justifying an explanation regarding the reason for the situation. Non-limiting examples of payroll facts include: a defined contribution limit has been reached; a change in a contribution amount; a change in taxation (Social Security limit met, changes in residency that affect state income tax and/or local taxes); updates to federal and state income tax withholdings; overtime and premium pay earnings; number of hours worked; a benefit change based on open enrollment elections and/or qualifying life events; and/or facts regarding a withholding order such as, for example, a goal met, updates, a release from a withholding order, etc. And, in embodiments, a payroll fact may be attached to a payroll policy. A payroll policy can be a natural language representation of what has changed. Therefore, as more payroll policies are created to calculate payroll, these policies can have one or more payroll facts linked to them to explain changes in net pay.

In embodiments, insights can be provided in a hierarchy to explain changes in net pay. For example, in order to explain why a paycheck is different, insights can be organized in a hierarchy of insight messages that start from a generic level of insight (coarse grain), to the level of explaining the formula that was used to calculate the inputs that resulted on the change in net pay (fine grain). The insights hierarchy can be organized in the following manner, by way of non-limiting example:

(i) what happened (e.g., net pay increased/decreased by a certain amount);
(ii) what caused the change (e.g., a deduction was removed, an earning was added, a deduction amount decreased, etc.);
(ii) why did the change happen (e.g. worker reached the annual limit on their 401(k) of $19,500.00); and
(iv) how is the change calculated (explains the formula in natural language, e.g., gross pay*0.062=amount of Social Security to be withheld).

Figure 3:
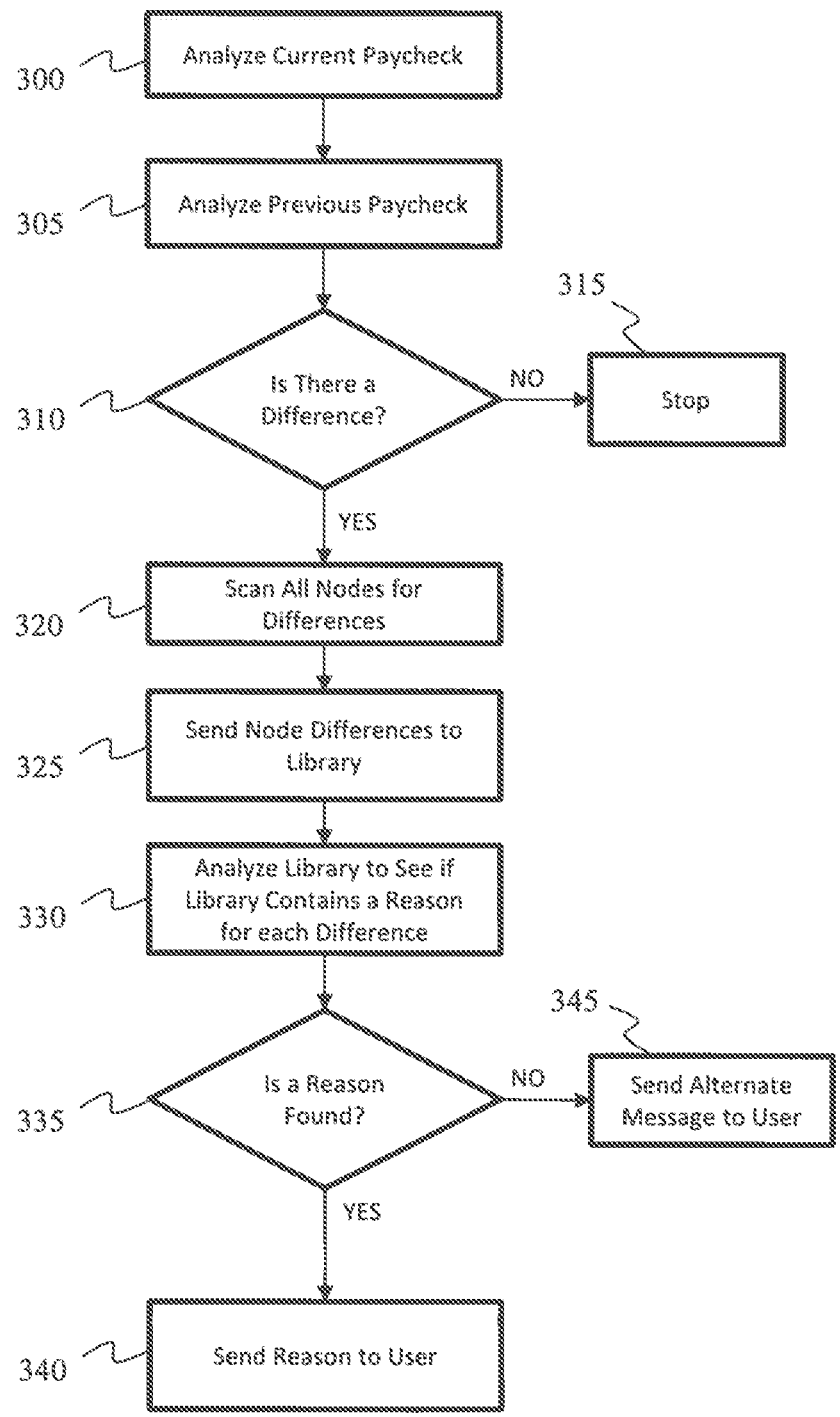
FIG. 3 depicts an exemplary flow for a process in accordance with aspects of the present disclosure.

FIG. 3 depicts an exemplary flow for a process in accordance with aspects of the present disclosure. The exemplary flow can be illustrative of a system, a method, and/or a computer program product and related functionality implemented on the computing system of FIG. 1. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow of FIG. 3 can be downloaded to respective computing/processing devices, e.g., computing system of FIG. 1 as already described herein, or implemented on a cloud infrastructure as described with regard to FIG. 2. It should be understood that the steps of FIG. 3 can be provided in a different order.

At step 300, the system analyzes a current paycheck. As already described herein, the information analyzed can be fields in the paycheck such as, for example, salary, overtime pay, bonus pay, back pay, tax deductions, retirement account deductions, insurance deductions, deductions for repayment of previous payroll advances, etc. At step 305, the system analyzes a previous paycheck. The information analyzed can be the same information or fields analyzed regarding the current paycheck in step 300. Accordingly, the analysis of steps 300 and 305 can include determining the values of monetary fields in both the current and previous paychecks.

At step 310, the system compares the results of the analysis performed in steps 300 and 305 and determines if there is a difference in any field of the current paycheck as compared to the previous paycheck. If it is determined at step 310 that there is no difference in any field, then processing continues to step 315, where the processing stops. If it is determined at step 310 that there is a difference in a field, then processing continues to step 320.

At step 320, the system scans all fields in both the current paycheck and the previous paycheck for differences in any field. In embodiments, the comparison at step 310 stops as a result of a difference being discovered in one field. In such embodiments, once a single difference is discovered at step 310, processing then proceeds to step 320 for a full scanning of all fields.

At step 325, the differences discovered at step 320 are sent to a library that contains possible causes or reasons for the values of fields changing. The library can contain data or connections to data sources that provide insight as to what affects a paycheck field. For example, the library can contain tax regulations data, retirement account regulations data, healthcare insurance data, and other data or information related to paycheck additions or deductions.

Still referring to FIG. 3, after step 330, the system analyzes the library to determine if the library contains a reason, or information supporting a reason, for the changes in the paychecks or payroll events. At step 335, if a reason is found in the library, then the reason is sent to, for example, the recipient of the paycheck at step 340. If a reason is not found in the library at step 335, then an alternate message is sent to, for example, the recipient of the paycheck at step 345. In embodiments, the alternate message directs the recipient of the paycheck to a payroll or human resources department of, for example, the employer or a payroll service provider.

In embodiments, insight generation may be a two-phase process. First, the payment may be analyzed and matched against a set of predefined rules. The first step extracts the facts, based on the rules that match the payment calculation. For example, where the fact is a change in a 401(k) contribution amount, the system extracts a rule that calculates a 401(k) contribution based on the amount of the pay for this period. The system may extract several rules. In this example, the system also extracts a rule that defines the annual limit for 401(k) contributions and compares this particular paycheck to that limit. In some cases, these two rules may be combined in one rule.

The second phase of the insight generation process maps the facts that were extracted during the analysis to the insight messages. For example, for the fact that the 401(k) contribution changed, the system will map this fact, and the rule(s) determining that the contribution changed because the annual limit was reached, to an insight explaining this reason for the change. The insight is then displayed to the user on, for example, one of the displays shown in FIGS. 9 and 10. In embodiments, the system generates tree representations of the fields of a paycheck with the various fields being represented as nodes on the tree, as explained below with reference to FIGS. 4-7.

Figure 4:
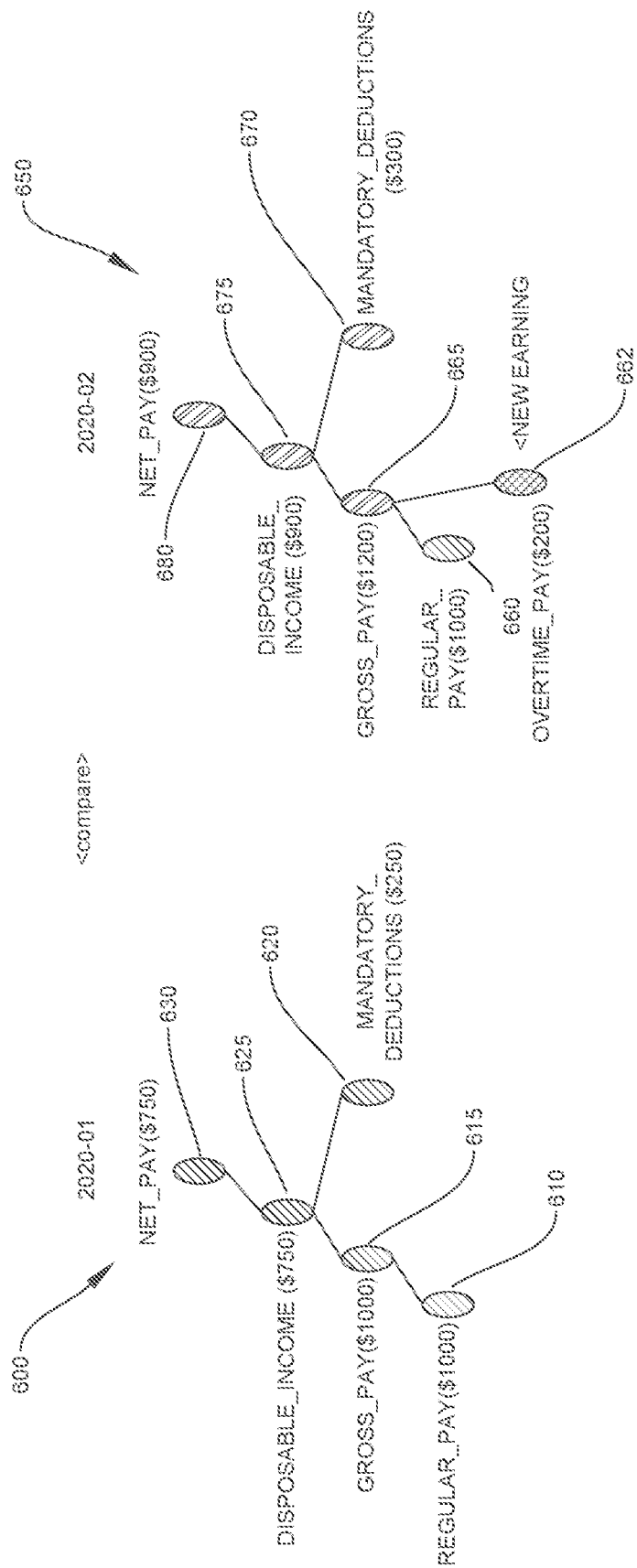
FIG. 4 depicts a comparative example of two paychecks in accordance with aspects of the present disclosure.

FIG. 4 shows a scenario in which new earnings are included and nodes (additions and deductions) of a first paycheck 600 (2020 January) are compared to nodes of a second paycheck 650 (2020 February). More specifically, FIG. 4 shows a comparison of information (e.g., nodes or fields) related to a first paycheck 600 and a second paycheck 650. In the first paycheck 600, a regular pay 610 is $1,000. Because regular pay 610 is the only addition to paycheck 600, gross pay 615 is also $1,000. Mandatory deductions 620 of $250 are shown as a deduction from gross pay 615, resulting in a disposable income 625 of $750. Because there are no further additions or deductions, net pay 630 matches disposable income 625 and is, therefore, $750.

On the other hand, the second paycheck 650 shows a regular pay 660 of $1,000. Additional pay in the form of overtime pay 662 is equal to $200. Gross pay 665 is the sum of regular pay 660 ($1,000) and overtime pay 662 ($200), which results in $1,200. Mandatory deductions 670 of $300 are shown as a deduction from gross pay 665, resulting in a disposable income 675 of $900. Because there are no further additions or deductions, net pay 680 matches disposable income 675 and is, therefore, $900, which is different than the $750 net pay in first paycheck 600. This difference in net pay is what can prompt a user to ask a question as to why the net pay is different.

After analysis of payment in the second paycheck 650 to the first paycheck 600, an insight (explanation) as to the change can be generated as to why there are differences. For example, in this case, the added pay (overtime pay 662) and the increase in mandatory deductions 670 are changes that could provoke a question from a user. The system produces appropriate insights for display to the user, as discussed above. In this example, one insight could be an explanation that gross pay has increased due to $200 in overtime pay, and another insight could be that mandatory deductions increased due to the increase in gross pay.

Figure 5:
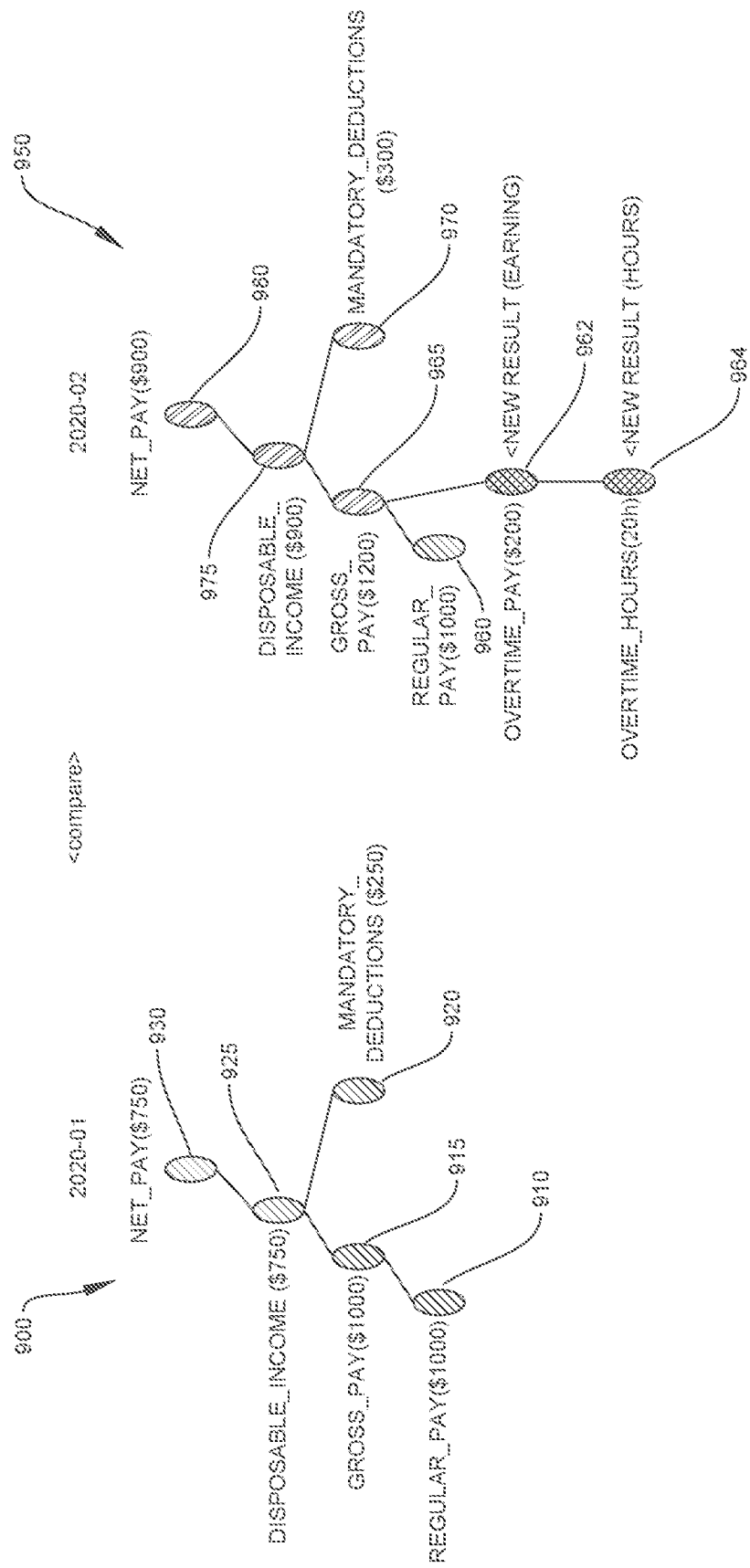
FIG. 5 depicts a comparative example of two paychecks in accordance with additional aspects of the present disclosure.

FIG. 5 shows a second scenario in which a specialized overtime policy result was detected in a paycheck. In this example, nodes of a first paycheck 900 (2020 January) are compared to nodes of a second paycheck 950 (2020 February). The first paycheck 900 shows a regular pay 910 of $1,000. As the regular pay 910 is the only addition to paycheck 900, gross pay 915 is also $1,000. Mandatory deductions 920 of $250 are shown as a deduction from gross pay 915, resulting in a disposable income 925 of $750. Because there are no further additions or deductions, net pay 930 matches disposable income 925 and is, therefore, $750.

On the other hand, the second paycheck 950 shows a regular pay 960 of $1,000. Additional pay in the form of overtime pay 962 is equal to $200. The additional explanation of overtime hours 964 shows that 20 overtime hours are being paid. Gross pay 965 is the sum of regular pay 960 ($1,000) and overtime pay 962 ($200), which results in $1,200. Mandatory deductions 970 of $300 are shown as a deduction from gross pay 965, resulting in a disposable income 975 of $900. Because there are no further additions or deductions, net pay 980 matches disposable income 975 and is, therefore, $900, which is different than the $750 net pay in first paycheck 900. This difference in net pay is what can prompt a user to ask a question as to why the net pay is different.

The example shown in FIG. 5 generates two different insights based on the added pay (overtime pay 962) and the increase mandatory deductions 970. The system produces appropriate insights for display to the user, as discussed above. In this example, one insight could be an explanation that gross pay has increased due to $200 in overtime pay, including the information that 20 overtime hours were worked to produce this overtime pay, and another insight could be that mandatory deductions increased due to the increase in gross pay.

Figure 6:
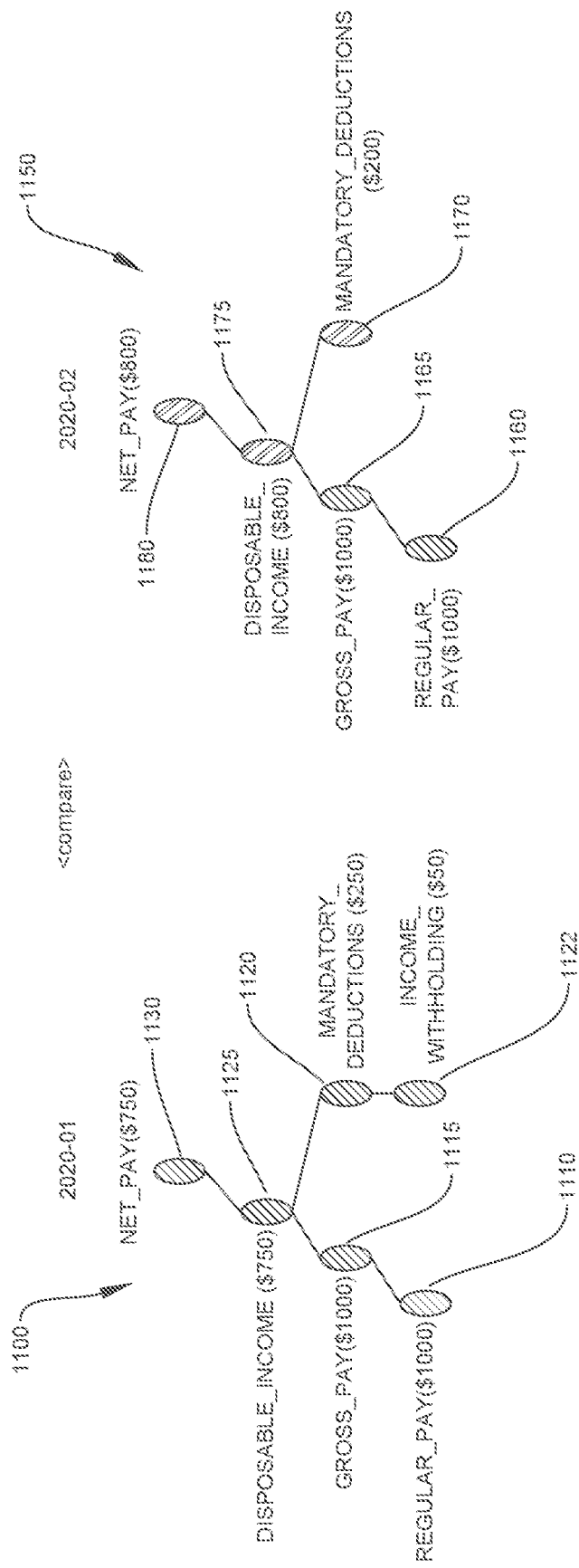
FIG. 6 depicts a comparative example of two paychecks in accordance with additional aspects of the present disclosure.

FIG. 6 shows a third scenario in which a general deduction is eliminated. In this example, nodes of a first paycheck 1100 (2020 January) are compared to nodes of a second paycheck 1150 (2020 February). First paycheck 1100 shows a regular pay 1110 of $1,000. Because regular pay 1110 is the only addition to paycheck 1100, gross pay 1115 is also $1,000. Mandatory deductions 1120 of $250 are shown as a deduction from gross pay 1115, resulting in a disposable income 1125 of $750. Note that mandatory deductions 1120 include an income withholding 1122 of $50. Because there are no further additions or deductions, net pay 1130 matches disposable income 1125 and is, therefore, $750.

On the other hand, the second paycheck 1150 shows a regular pay 1160 of $1,000. Because regular pay 1160 is the only addition to paycheck 1150, gross pay 1165 is also $1,000. Mandatory deductions 1170 of $200 are shown as a deduction from gross pay 1165, resulting in a disposable income 1175 of $800. Note that mandatory deductions 1170, in contrast to first paycheck 1100, does not include an income withholding of $50. Because there are no further additions or deductions, net pay 1180 matches disposable income 1175 and is, therefore, $800, which is different than the $750 net pay in first paycheck 1100. This difference in net pay is what can prompt a user to ask a question as to why the net pay is different.

The example shown in FIG. 6 generates an insight noting the eliminated income withholding. For example, the decreased amount of mandatory deductions 1170 is a change that could provoke a question from a user. Accordingly, the system produces an appropriate insight for display to the user, as discussed above. In this example, the insight could be an explanation that mandatory deductions had decreased $50 because income withholding 1122 is no longer in effect. The insight could additionally explain why the income withholding is no longer in effect. For example, the income withholding could have been based on the user reimbursing the employer for an advance on the user's pay and the advance was completely paid back to the employer by the income withholding 1122 in paycheck 1100, leaving a zero balance.

Figure 7:
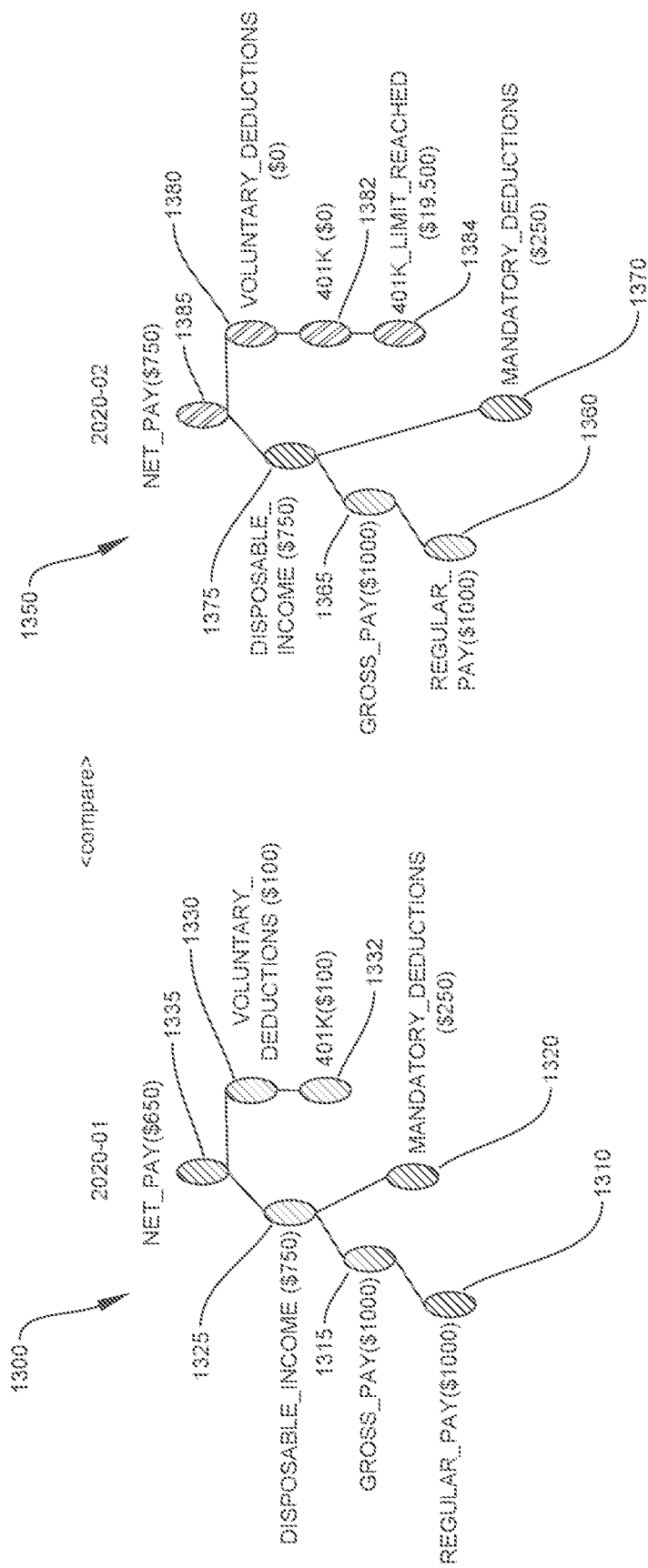
FIG. 7 depicts a comparative example of two paychecks in accordance with additional aspects of the present disclosure.

FIG. 7 shows a fourth scenario in which the limit on 401(k) contributions is reached. In this example, nodes of a first paycheck 1300 (2020 January) are compared to nodes of a second paycheck 1350 (2020 February). First paycheck 1300 shows a regular pay 1310 of $1,000. Because regular pay 1310 is the only addition to paycheck 1300, gross pay 1315 is also $1,000. Mandatory deductions 1320 of $250 are shown as a deduction from gross pay 1315, resulting in a disposable income 1325 of $750. Voluntary deductions 1330 of $100 are shown as a deduction from disposable income 1325, resulting in a net pay 1335 of $650. Note that voluntary deductions 1330 include a 401(k) deduction 1332 of $100.

On the other hand, the second paycheck 1350 shows a regular pay 1360 of $1,000. Because regular pay 1360 is the only addition to paycheck 1350, gross pay 1365 is also $1,000. Mandatory deductions 1370 of $250 are shown as a deduction from gross pay 1365, resulting in a disposable income 1375 of $750. Voluntary deductions 1380 of $0 are shown as a deduction from disposable income 1375, resulting in a net pay 1385 of $750, which is different than the $650 net pay in first paycheck 1100. This difference in net pay is what can prompt a user to ask a question as to why the net pay is different.

Note that voluntary deductions 1380 are shown as including a 401(k) deduction 1382 of $0 (the normal 401(k) deduction is $100, as shown in first paycheck 1300). Also included under voluntary deductions 1380 is a node 1384 explaining that the 401(k) contribution limit has been reached. In a case where the 401(k) limit (or any other limit) is reach with the addition of only a portion of the normal voluntary deduction, then only that portion that is needed to reach the limit will be deducted.

The example shown in FIG. 7 generates an insight related to the 401(k) contribution limit being reached. For example, the decreased amount of voluntary deductions 1380 is a change that could provoke a question from a user. The system produces an appropriate insight for display to the user, as discussed above. In this example, the insight could be an explanation that mandatory deductions had decreased to zero because second paycheck 1350 has no 401(k) deduction. The insight could additionally explain that the 401(k) deduction is zero because the annual limit for 401(k) deductions has been reached.

Figure 8:
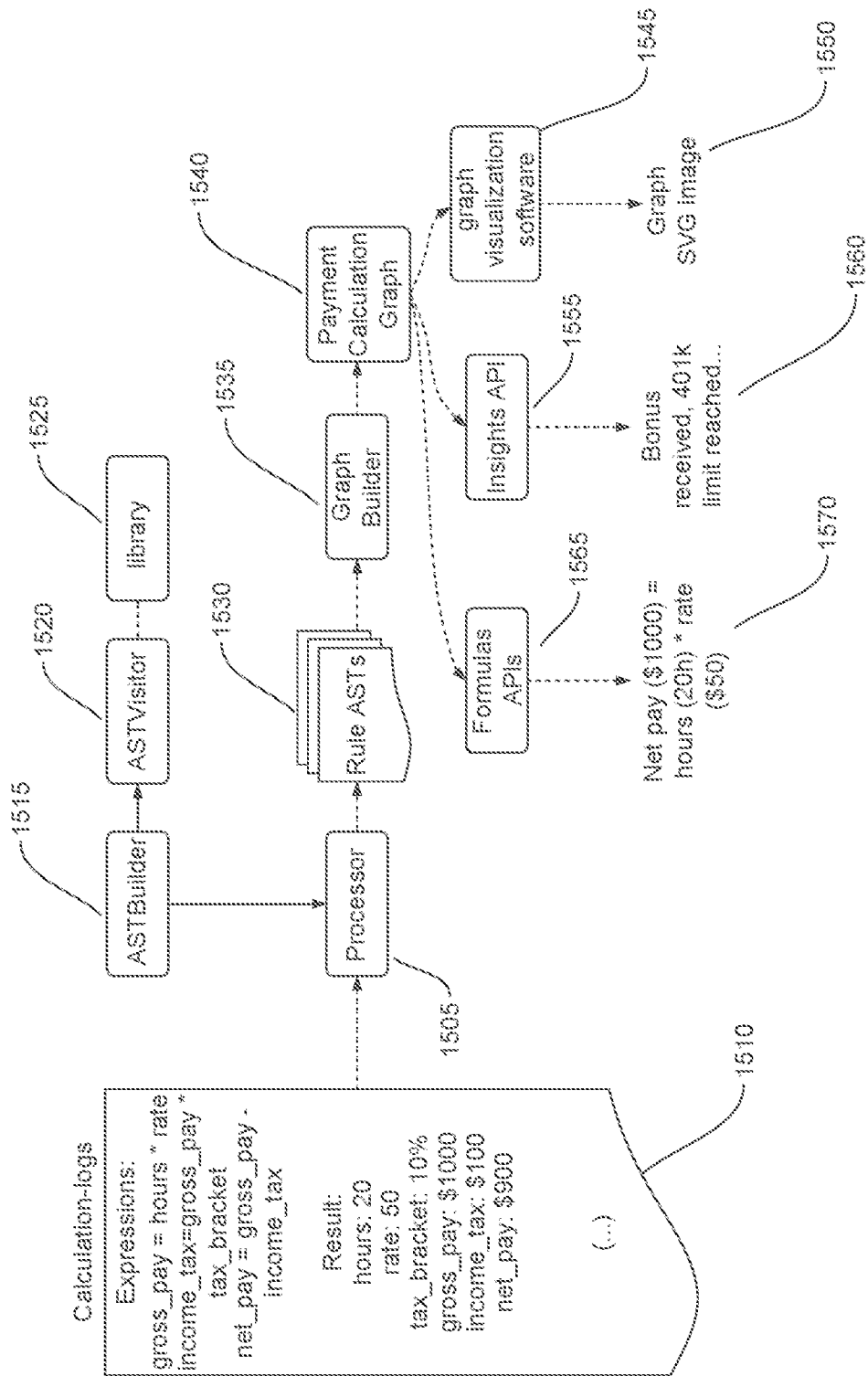
FIG. 8 depicts an exemplary computing infrastructure in accordance with aspects of the present disclosure.

FIG. 8 shows an exemplary environment which can implement the methods as described herein. In this exemplary environment, a processor 1505 (e.g., process 115 of FIG. 1) receives information such as, for example, mathematical expressions and results from calculation logs 1510. The calculations log can be a database of formulas used to calculate the various fields on a paycheck and the values of those fields that result from the calculations. For example, the calculation logs may include different calculations such as gross pay, income take and net pay calculations. The results may include, for example, the number of hours, rate, tax bracket, gross pay, income tax and net pay figures.

An abstract syntax tree (AST) builder 1515 builds tree representations of the fields of a paycheck with the various fields being represented as nodes on the tree, as shown in FIGS. 4-7. An AST visitor 1520 creates patterns (such as visitor patterns) that allow implementation of operations on the nodes of the ASTs built in AST builder 1515. A library 1525, such as, for example, a groovy library, is a collection of resources used by AST builder 1515 and AST visitor 1520.

Rule ASTs 1530 is a collection of ASTs that contain rules to be applied to paychecks being compared. For example, the rules can be certain deductions and explanation of such deduction, amongst other rules. A graph builder 1535 uses rule ASTs 1530 to produce a payment calculation graph 1540 which contains the information used by formula application programming interfaces (APIs) 1565, an insights API 1555, and graph visualization software 1545. An example of a formula API 1565 comprises formula 1570 that calculates net pay from hours and rate. An example of insights API 1555 can include one or more explanation (e.g., insights) 1560 regarding an increase or decrease in net pay as a result of many different factors, e.g., the user's 401(k) limit being reached. Graph visualization software 1545 produces graph images 1550 such as, for example, scalable vector graphic (SVG) images as shown in FIGS. 9 and 10.

Figure 9:
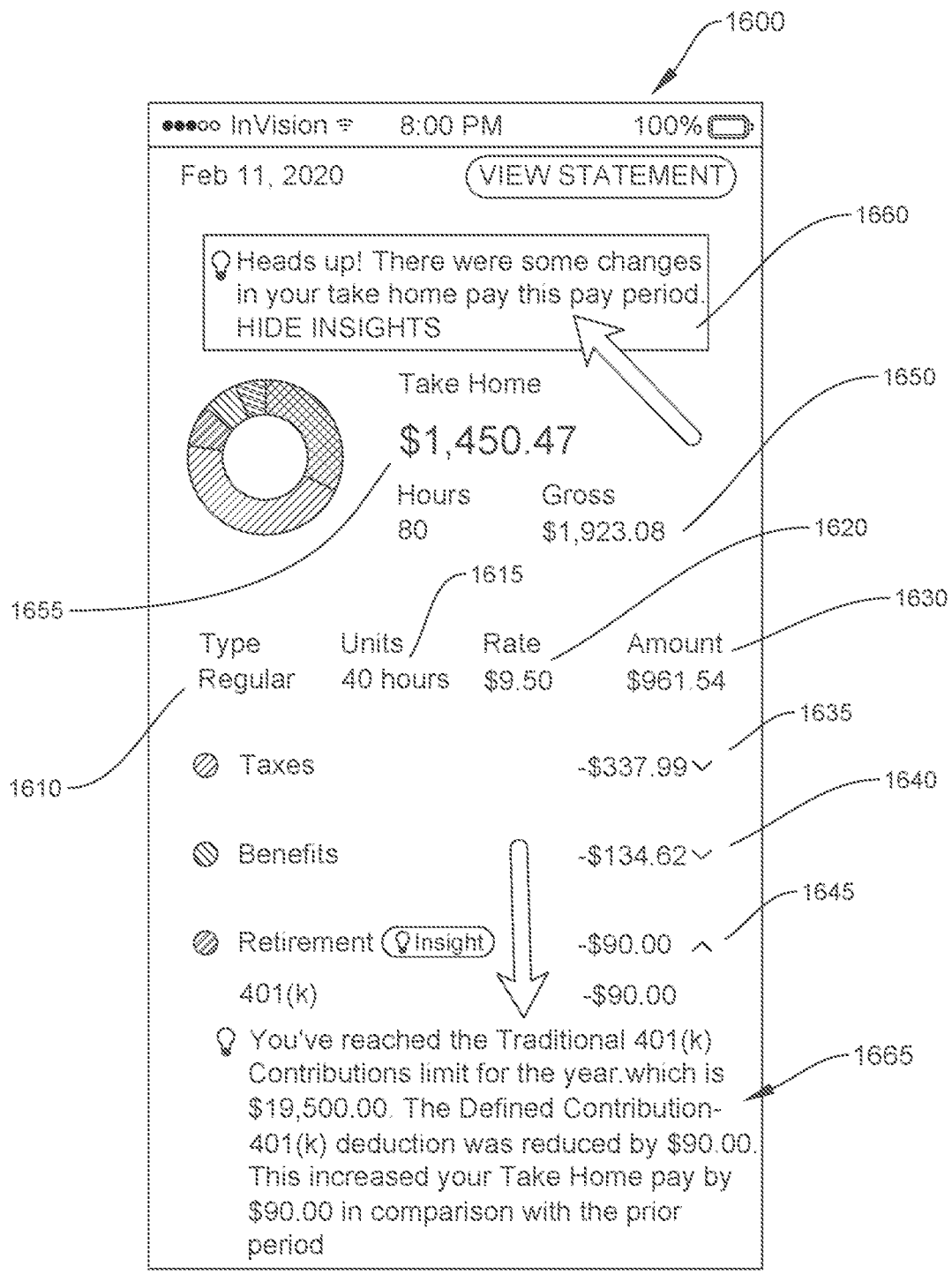
FIG. 9 depicts an exemplary display in accordance with aspects of the present disclosure.

FIG. 9 shows an example of a graphical user interface 1600 (provided on a user's device) that displays information regarding the user's paycheck. This graphical user interface can be generated using the processes shown in FIG. 8, as an example. While the example shown in FIG. 9 is for a mobile device, other user devices are also contemplated for use with the systems, methods and computer program products described in the present disclosure. In embodiments, software necessary to implement aspects of the present disclosure can reside on the user device or on a third party device, e.g., ADP.

This example shows type of pay 1610, unit hours 1615, rate 1620, amount 1630, taxes 1635, benefits 1640, retirement contributions 1645, gross pay 1650 and take home pay (e.g., net pay) 1655. In addition, the graphical user interface 1600 includes a notification field 1660 which provides notification to the user that changes have been made to the user's take home pay for the current pay period. This example also shows a notification field 1665 which provides notification to the user of the specific change to the user's paycheck and the reason for that change. In this case, the user has reached the user's limit for 401(k) contributions.

Figure 10:
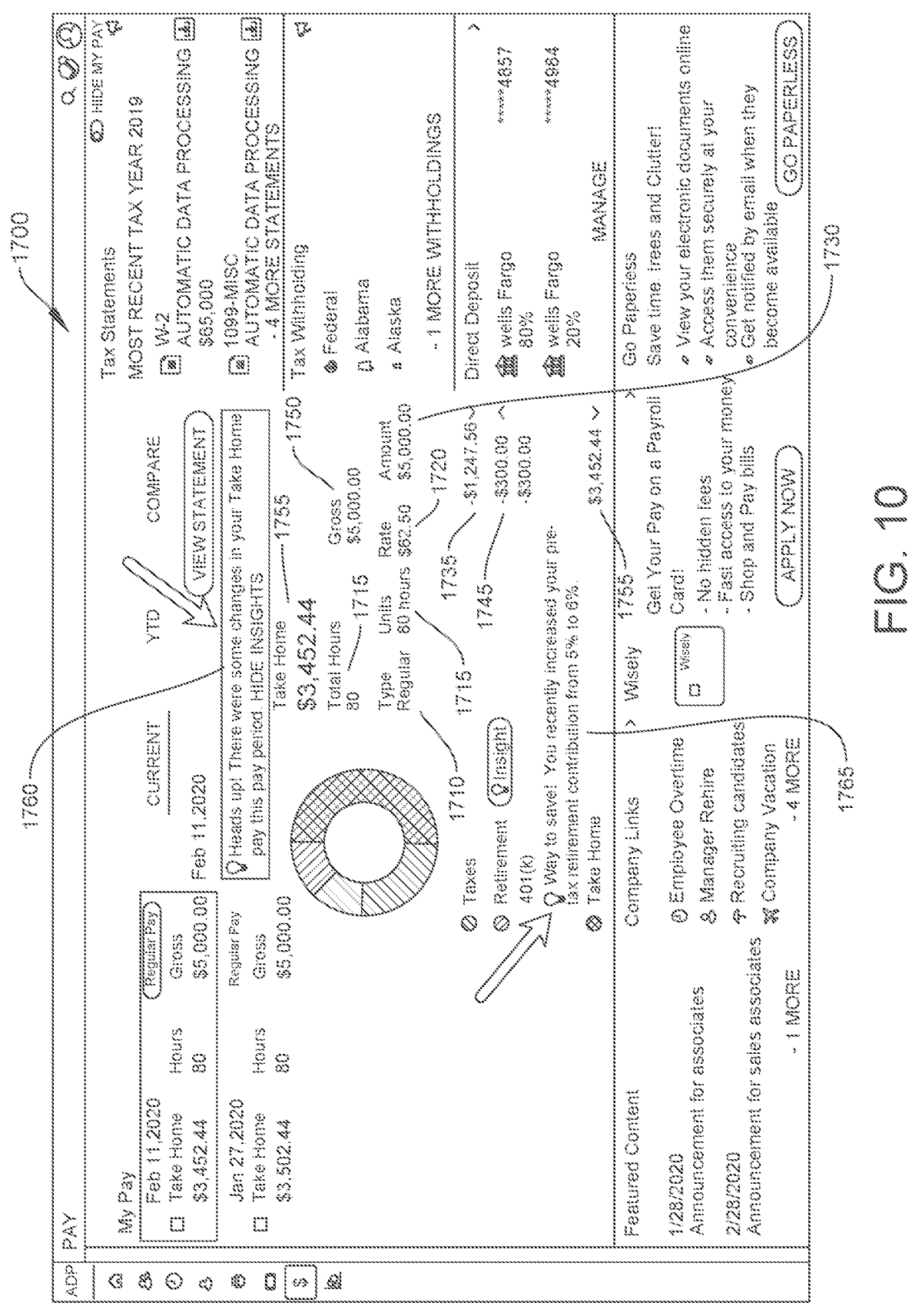

FIG. 10 shows another example of a graphical user interface 1700 that displays information regarding the user's paycheck. In this embodiment, the graphical user interface 1700 shown in FIG. 10 may be representative of a display of a laptop or desktop computing system or terminal Similar to the interface of FIG. 9, in this example the graphical user interface 1700 shows type of pay 1710, unit hours 1715, rate 1720, amount 1730, taxes 1735, retirement contributions 1745, gross pay 1750 and take home pay (e.g., net pay) 1755. The example also provides the user with the ability to download tax statements, tax withholdings and direct deposit statements, amongst other features. This example also shows a notification field 1760 which provides notification to the user that changes have been made to the user's take home pay for the current pay period. This example also shows a notification field 1765 which provides notification to the user of the specific change to the user's paycheck and the reason for that change. In this case, the user has reached the user's limit for 401(k) contributions.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system comprising:
one or more processors, a computer readable memory, one or more computer readable storage media, and program instructions collectively stored on the one or more computer readable storage media, the program instructions executable to cause the one or more processors to:
build, for storage in a database, a first graphical electronic tree representation of fields of a first paycheck, the fields being represented as a first plurality of nodes in the first graphical electronic tree representation;
build, for storage in the database, a second graphical electronic tree representation of fields of a second paycheck, the fields being represented as a second plurality of nodes in the second graphical electronic tree representation;
determine, based on scanning one or more nodes of the first plurality of nodes in the first graphical electronic tree representation and corresponding nodes of the second plurality of nodes in the second graphical electronic tree representation, a change in a corresponding node value based on a first value represented by the one or more nodes and a second value represented by the corresponding nodes;
cause a display of a notification corresponding to the change in the corresponding node value on a user device via a graphical user interface;
identify, from a pattern library, a plurality of factors associated with the fields of the first paycheck or the fields of the second paycheck;
determine, using one or more application programming interfaces configured to access payroll information from one or more databases or data sources, at least one factor of the plurality of factors causing the change in the corresponding node value by applying one or more rules identified from the payroll information to the one or more nodes and the corresponding nodes;
determine a first explanation for the change in the corresponding node value based on the at least one factor;
determine a second explanation for the change in the corresponding node value based on the one or more rules;
organize the first explanation and the second explanation in a hierarchy, the hierarchy based on the first explanation having a first level and the second explanation having a second level;
generate a first message corresponding with the first explanation and a second message corresponding with the second explanation; and
cause, based on the organization of the first explanation and the second explanation, a display of the first message or the second message on the user device via the graphical user interface with wage information associated with the second paycheck.

2. The system of claim 1, wherein at least one of the first graphical electronic tree representation and the second graphical electronic tree representation correspond to one or more abstract syntax trees.

3. The system of claim 1, wherein the one or more rules correspond to one or more abstract syntax trees configured to provide at least the first explanation.

4. The system of claim 1, the one or more application programming interfaces comprising at least one of:
a formula application programming interface corresponding to one or more formulas associated with the change in the corresponding node value; and
an insights application programming interface corresponding to a plurality of explanations for the change in the corresponding node value.

5. A method comprising:
building, by one or more processors, for storage in a database, a first graphical electronic tree representation of fields of a first paycheck, the fields being represented as a first plurality of nodes in the first graphical electronic tree representation;
building, by the one or more processors, for storage in the database, a second graphical electronic tree representation of fields of a second paycheck, the fields being represented as a second plurality of nodes in the second graphical electronic tree representation;
determining, by the one or more processors, based on scanning one or more nodes of the first plurality of nodes in the first graphical electronic tree representation and corresponding nodes of the second plurality of nodes in the second graphical electronic tree representation, a change in a corresponding node value based on a first value represented by the one or more nodes and a second value represented by the corresponding nodes;
causing, by the one or more processors, a display of a notification corresponding to the change in the corresponding node value on a user device via a graphical user interface;
identifying, by the one or more processors, from a pattern library, a plurality of factors associated with the fields of the first paycheck or the fields of the second paycheck;
determining, by the one or more processors, using one or more application programming interfaces configured to access payroll information from one or more databases or data sources, at least one factor of the plurality of factors causing the change in the corresponding node value by applying one or more rules identified from the payroll information to the one or more nodes and the corresponding nodes;
determining, by the one or more processors, a first explanation for the change in the corresponding node value based on the at least one factor;
determining, by the one or more processors, a second explanation for the change in the corresponding node value based on the one or more rules;
organizing, by the one or more processors, the first explanation and the second explanation in a hierarchy, the hierarchy based on the first explanation having a first level and the second explanation having a second level;
generating, by the one or more processors, a first message corresponding with the first explanation and a second message corresponding with the second explanation; and
causing, by the one or more processors, based on the organization of the first explanation and the second explanation, a display of the first message or the second message on the user device via the graphical user interface with wage information associated with the second paycheck.

6. The method of claim 5, wherein at least one of the first graphical electronic tree representation and the second graphical electronic tree representation correspond to one or more abstract syntax trees.

7. The method of claim 5, wherein the one or more rules correspond to one or more abstract syntax trees configured to provide at least the first explanation.

8. The method of claim 5, the one or more application programming interfaces comprising at least one of:
- a formula application programming interface corresponding to one or more formulas associated with the change in the corresponding node value; and
- an insights application programming interface corresponding to a plurality of explanations for the change in the corresponding node value.

* * * * *